(12) United States Patent
Kaneko et al.

(10) Patent No.: US 7,992,847 B2
(45) Date of Patent: Aug. 9, 2011

(54) EARTHQUAKE-PROOF PLINTH TO PROTECT AN OBJECT THEREON

(75) Inventors: Tomonao Kaneko, Tsurugashima (JP); Noboru Yamane, Hanno (JP); Kouichi Murakoshi, Saitama (JP)

(73) Assignee: Musashi Co., Ltd., Oaza-Machiya, Tsurugashima-shi, Saitama (JP)

( * ) Notice: Subject to any disclaimer, the term of this patent is extended or adjusted under 35 U.S.C. 154(b) by 1140 days.

(21) Appl. No.: 11/710,501

(22) Filed: Feb. 26, 2007

(65) Prior Publication Data

US 2007/0199256 A1 Aug. 30, 2007

(30) Foreign Application Priority Data

Feb. 24, 2006 (JP) .................. 2006-048620

(51) Int. Cl.
*F16M 1/00* (2006.01)
(52) U.S. Cl. .................. 267/136; 312/117; 248/638
(58) Field of Classification Search .................. 267/136, 267/140.11, 140.13–140.15; 312/114, 117, 312/121, 319.1, 319.2, 327, 328, 329; 248/550, 248/551, 636, 638, 559, 618; 109/3, 4, 46
See application file for complete search history.

(56) References Cited

U.S. PATENT DOCUMENTS

| 5,165,768 A * | 11/1992 | Zarrabi et al. ............... 312/114 |
| 5,671,984 A * | 9/1997 | Kodera ........................ 312/114 |
| 5,853,235 A * | 12/1998 | Barnes ........................ 312/117 |
| 6,412,890 B1 * | 7/2002 | Kaneko et al. ............... 312/117 |
| 2009/0212475 A1 * | 8/2009 | Tropf ............................. 267/75 |

FOREIGN PATENT DOCUMENTS

| JP | 2746253 | 2/1998 |
| JP | 345 8089 | 8/2003 |
| JP | 2003-259945 A | * 9/2003 |
| JP | 2007-325895 A | * 12/2007 |

* cited by examiner

*Primary Examiner* — Pam Rodriguez
(74) *Attorney, Agent, or Firm* — Jacobson Holman PLLC

(57) ABSTRACT

An earthquake-proof plinth includes a display floor plate that has an aperture configured to fit a middle section of an article seated on the plinth and that has a seat panel passing through the aperture and supported by a shaft extending vertically downward from the seat panel; a vibration sensor; a shaft stopper that stops the seat panel and shaft in a shock-absorbing elastic fashion when the article still on the seat panel falls and eventually has its middle section fitted in the aperture of the floor plate; and a retainer that normally retains the shaft in position to keep the seat panel flush with the display floor plate while it releases the shaft in response to a detection signal from the vibration sensor to let the seat panel and shaft drop.

18 Claims, 3 Drawing Sheets

EARTHQUAKE-PROOF PLINTH TO PROTECT AN OBJECT THEREON

FIELD OF THE INVENTION

The present invention relates to an earthquake-proof plinth to prevent an object(s) thereon from fracturing because of its tumbling or falling down in situations such as exhibitions where articles of historically and artistically precious work, expensive chinaware, and/or esthetic handicraft such as glass-art ware are displayed in a museum, a reception room cabinet, or a showcase in a shop or a showroom.

BACKGROUND ART

Fragile articles such as the above-mentioned precious artistic work, left in a cabinet, a whatnot, or a showcase, are prone to tumble or fall down to fracture depending on the tremors when an earthquake occurs. Usually, the articles are guarded by tautened rope or bracing that surrounds the articles. As to a particularly large artwork object, several lines of rope are typically tautened and spread out at a certain distance from each other. However, such methods are unsatisfactory as a full protection means from articles' tumbling or falling down. Such methods give esthetically adverse effects as well as bothering obstacles to viewers.

In order to overcome the aforementioned disadvantages, there has been proposed an anti-vibration protecting plinth that comprises a holder holding an object seated thereon, a sensor for detecting vibrations, a releasing means receiving a signal from the sensor for making the holder release the object, and a protecting means located under the holder to serve as a buffer to receive the object dropped as a result of the releasing by the holder where the releaser includes a solenoid device activated by the signal from the sensor and a stopper disengaged from the holder by means of the solenoid device (see Patent Document 1 listed below).

Another type of plinth has been disclosed that comprises a base of a certain height with a pair of apertures opposed to each other in the top and bottom plates of the base where the aperture in the top plate can be opened and closed by sliding a pair of shutters that meet each other at the center of the aperture while the bottom plate is skirted around the aperture by a shock-absorbing and volume-adjustable bag with its upper open end fixed to a bottom plate so that the bag hangs down and is ready to trap an artistic object fallen from its seated location. This type of plinth further comprise an actuator and a vibration sensor, and the vibration sensor detects vibrations caused by an earthquake and makes the actuator move the shutters to open the aperture, so as to protect the artistic object from damages (see Patent Document 2 listed below).

Patent Document 1: Japanese Patent No. 2746253
Patent Document 2: Japanese Patent No. 3458089

In the anti-vibration protecting plinths as disclosed in Patent Document 1, after the object released from the holder is received at the shock-absorbing bottom of a box-shaped trap, the box-shaped trap has its upper opening closed by means of a trapdoor under the control of the releaser, thereby simply preventing the object from fracturing as a result of its being released through a drop into the trap. In short, the invention disclosed in Patent Document 1 functions to protect the released object in the trap from other droppings.

In practice, however, even if the trap of the plinth is provided with a shock-absorbing element such as sponge as is usually supposed to be, the object such as a chinaware article, when dropped from a height of its originally seated floor down onto the bottom of the trap by the gravitational force, is very likely to fracture. Thus, the invention disclosed in Patent Document 1 may be useful to protect the object from an impact given by other external objects during an earthquake, but substantially not to protect the delicately fragile object such as a chinaware article from the impact caused by a free fall of the object itself within the trap of the plinth.

In the earthquake-proof plinth as disclosed in Patent Document 2, it is noticeable that the bag is elastic and easily and assuredly adjustable in volume, and that the elasticity and adjustability are sufficient to serve as a means to protect the object against damage due to its free fall within the trap of the plinth. An arrangement where "the bottom plate is skirted around the aperture by a shock-absorbing and volume-adjustable bag with its upper open end fixed to the bottom plate so that the bag hangs down and is ready to trap an artistic object fallen . . ." advantageously utilizes a shock-absorbing property derived from an elastic property of the bag, and unless the object has a portion cornered or shaped in an extraordinarily sharpened cone, the bag can transform itself to softly embrace the object of any shape as a result of a small impact by such a dropping. The middle portion of the bag can be squeezed by tightening a strip to adjust a volume of the trap with ease. In addition, if the artistic object such as a chinaware article seated on the plinth is replaced from time to time and even if the replaced object is varied in shape and/or dimensions from before, the volume of the trap in the bag can be easily varied from one object to another as required, which is advantageous to minimize the impact caused by the act of dropping and also to prevent the object in the bag from spinning as a result of the dropping.

In the event of displaying an object, such as an porcelain article with flame-shaped frills around its upper rim and other uniquely contoured vases, that has a relatively large protrusion(s) from a main body, the box-shaped trap in the earthquake-proof plinth as disclosed in Patent Document 1 is very likely to fail to sufficiently absorb the impact upon receiving the dropped object at its shock-absorbing bottom to let the protrusion(s) of the object break off or crush into pieces.

The earthquake-proof plinth as disclosed in Patent Document 2 is capable of providing sufficient impact protection to a dropped object that has no protrusion(s). In the presence of relatively large protrusion(s) from the object, the pair of shutters, opening or closing between the periphery and the center of the opening at the top of the plinth, are prone to bump the protrusion(s) of the object to break it (them) off or crush it (them) into pieces.

The present invention is made to overcome the aforementioned disadvantages recognized in the prior art, and accordingly, it is an object of the present invention to provide an earthquake-proof plinth having a mechanism that can drop an article vertically on a seat while keeping the seat in its original horizontal orientation, and then, stop the article in the course of dropping by means of a shock-absorbing means, so that the article even with a protrusion(s) can be, as a whole, protected from an impact as it is dropped.

It is another object of the present invention to provide an earthquake-proof plinth having a mechanism that holds a middle section of an article to prevent it from tumbling down, so that the article seated on the plinth and its protrusion(s) can avoid damages, and especially, the mechanism can effectively prevent the protrusion(s) from being crushed or breaking off.

SUMMARY OF THE INVENTION

In order to attain the above-mentioned objects, an earthquake-proof plinth according to the present invention is comprised of a display floor plate that has an aperture dimensioned and shaped to fit a cross-section of the middle part of an article seated on the plinth and that has a seat panel passing through the aperture and supported by a shaft extending vertically downward from the seat panel; a vibration sensor detecting vibrations; a shaft stopper that stops the seat panel and shaft in a shock-absorbing elastic fashion when the article still on the seat panel falls and eventually has its middle section fitted in the aperture of the floor plate; and a retainer that normally retains the shaft in position to keep the seat panel flush with the display floor plate, releasing the shaft in response to a detection signal from the vibration sensor to let the seat panel and shaft drop.

Various aspects of the present invention will be given as follows:

The shaft stopper may include a shock-absorbing unit of an air cylinder. In this fashion, the impact on the article can be reduced upon stopping the movement of the shaft.

The shaft stopper may include a shock-absorbing unit capable of adjusting the amount of shock absorption provided by the shaft stopper. In such a manner, the impact on the article can be appropriately moderated upon stopping the movement of the shaft.

The shaft stopper is capable of adjusting the position where the shaft is to be stopped. In this way, it can be facilitated that the article has its middle section lightly come in contact with a shock-absorbing element encircling the aperture in the display floor plate.

The shock-absorbing element is provided in the display floor plate, encircling the aperture therein. In this fashion, the impact on the article can be reduced upon fitting the middle section in the aperture of the display floor plate.

The shock-absorbing element is an air-filled inner tube. In this manner, it can be facilitated to configure the highly shock-absorbing element.

Thus, the earthquake-proof plinth according to the present invention is advantageous in that it can reduce the impact on a displayed article as a whole as well as on its protrusion(s) when the article still on the seat panel is dropped in a trap under the article, since the seat remains in its original horizontal orientation and a shock-absorbing element is used to stop the article in the course of dropping. The plinth according to the present invention is also advantageous in that, due to preventing the article from falling down by holding a middle section thereof, the damage to the article with a protrusion(s), and in particular the crushing or breaking off of its protrusion(s) can be effectively prevented.

DETAILED DESCRIPTION OF THE INVENTION

BEST MODE OF THE INVENTION

Preferred embodiments of an earthquake-proof plinth 10 according to this invention will now be described in conjunction with the accompanying drawings.

Figure 1:
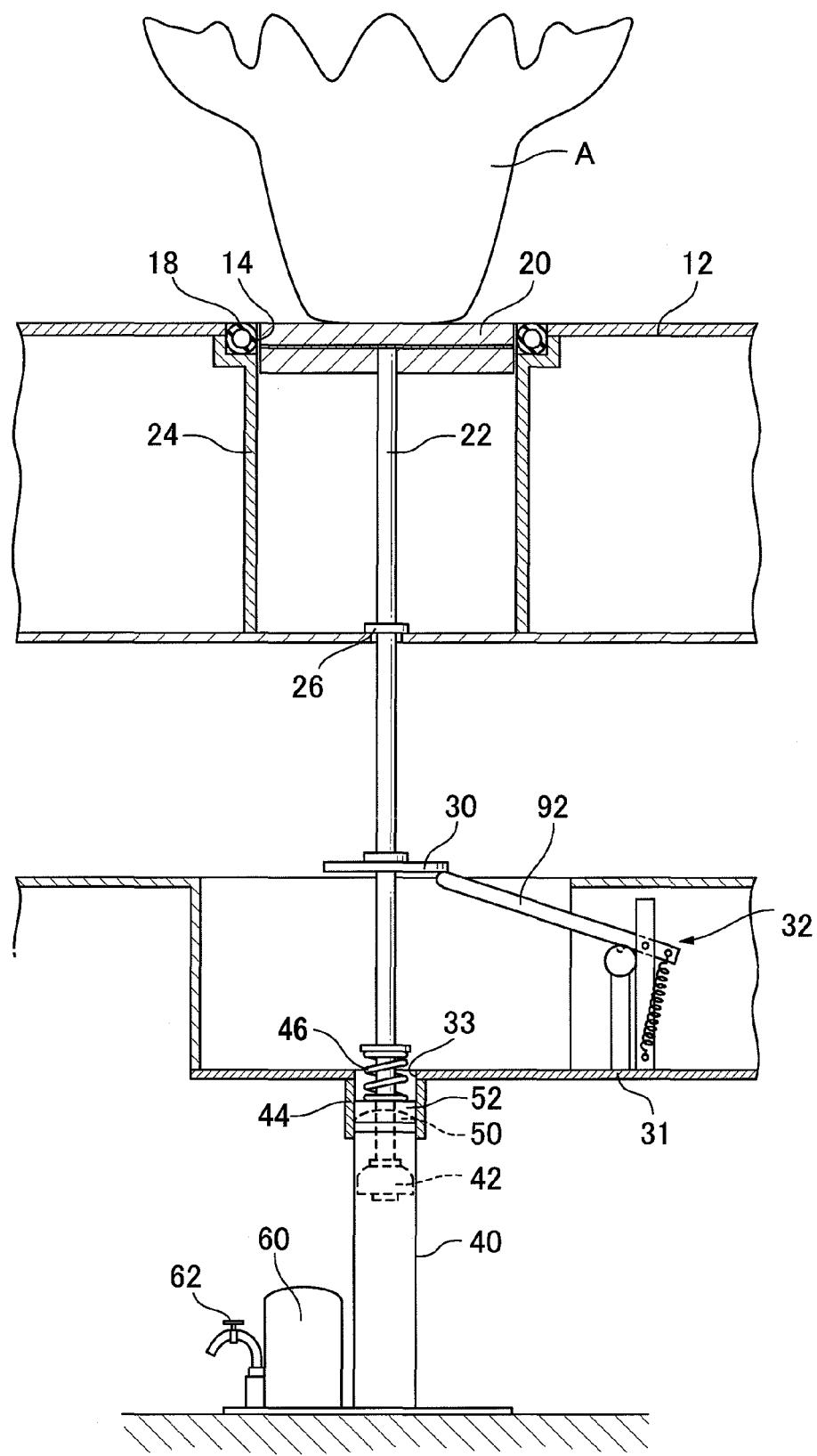
FIG. 1 is a vertical partial sectional view of an earthquake-proof plinth, illustrating an article seated thereon according to the present invention.
Figure 2:
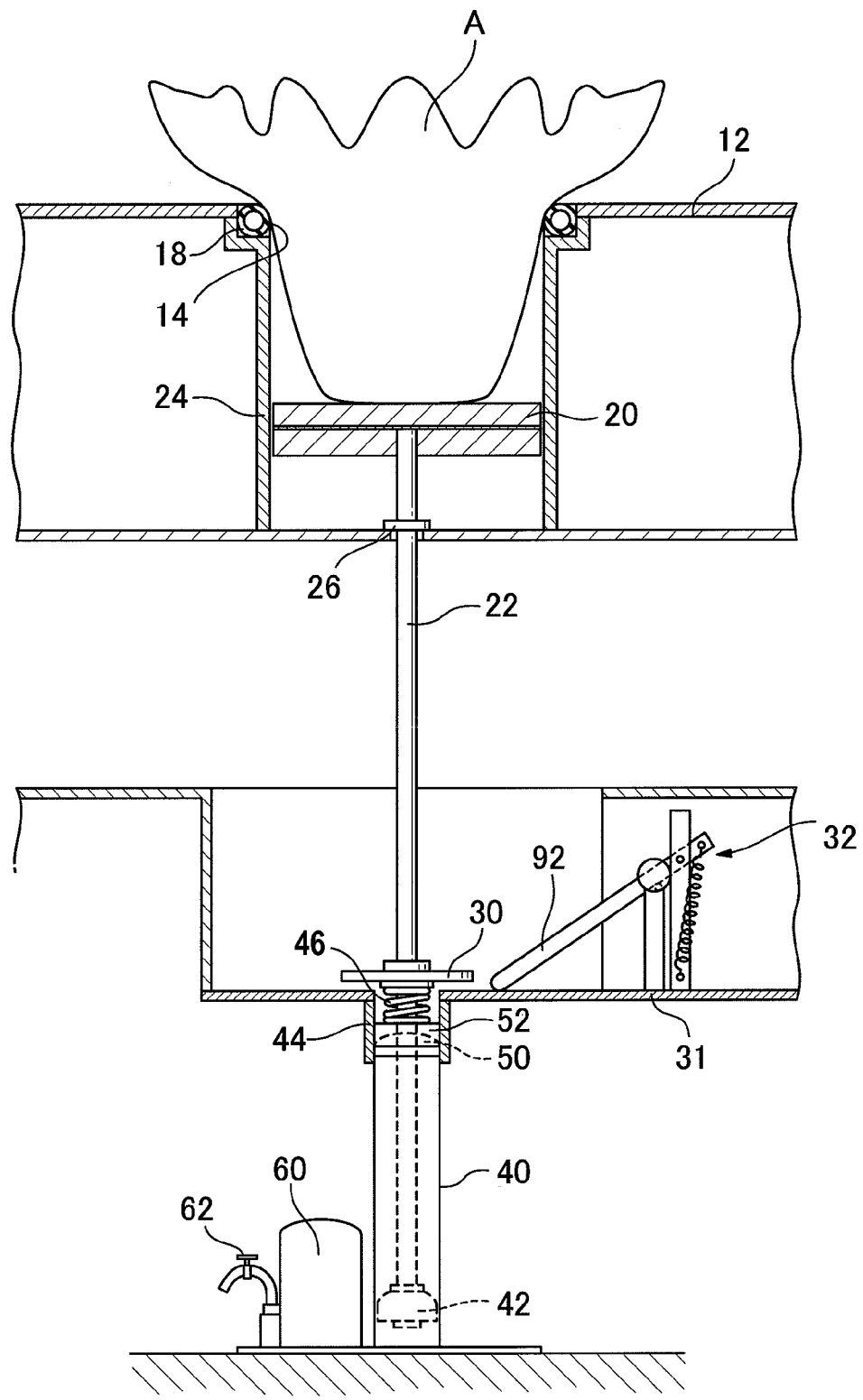
FIG. 2 is a vertical partial sectional view of the earthquake-proof plinth, illustrating the article dropped along with a component seat panel of the plinth according to the present invention.

The plinth 10 has, as shown in FIG. 1, a display floor plate 12 which has an aperture 14 defined in an area where an urn-like article A with flame-shaped frills around its upper rim is to be seated. The aperture 14 has its upper circumference encircled with a shock-absorbing tire tube 18. The article A is a piece of biscuit ware found in Thohkaichi, Niigata Prefecture, which has upper projections or frills shaped like flaring flames.

In the aperture 14, a seat panel 20 supported by a shaft 22 is located. The seat panel 20 is vertically movable through a cylinder-shaped hole 24 extending downward from the aperture 14. The shaft 22, which extends vertically downward from the seat panel 20, is guided by a shaft guide 26 substantially integrated with another piece of the floor plate 12 and then passes through an opening 33 formed in an intermediate plate 31 and leading to an air cylinder 40. A stopper disc 30 is fixed on an intermediate portion of the shaft 22. The stopper disc 30 is normally retained in a lifted position by an actuator 32 installed on the intermediate plate 31. When the onset of an earthquake is detected, a stopper arm 92 of the actuator 32 is disconnected from the stopper disc 30 to cause a free fall of the shaft 22.

A lower end of the shaft 22 is coupled to a piston member 42 that slides through the air cylinder 40 for a vertical reciprocating movement. An upper end of the air cylinder 40 is supported by an air cylinder holder 44 provided in the intermediate plate 31.

A cylinder cap 50 at the top of the air cylinder 40 is overlaid with an adjusting cap 52 used to regulate a height that the seat panel 20 is to reach. There are provided a number of adjusting caps 52 of various heights, and the most appropriate one is selectively located to adjust a stationery level of the seat plate 20.

On top of the adjusting cap 52 a coil spring 46 is placed that serves as a shock-absorber to elastically receive the stopper disc 30.

A compressor tank 60 is located right next to the air cylinder 40. The air cylinder 40 is in communication with the compressor tank 60. The compressor tank 60 is provided with an adjusting valve 62.

Figure 3:
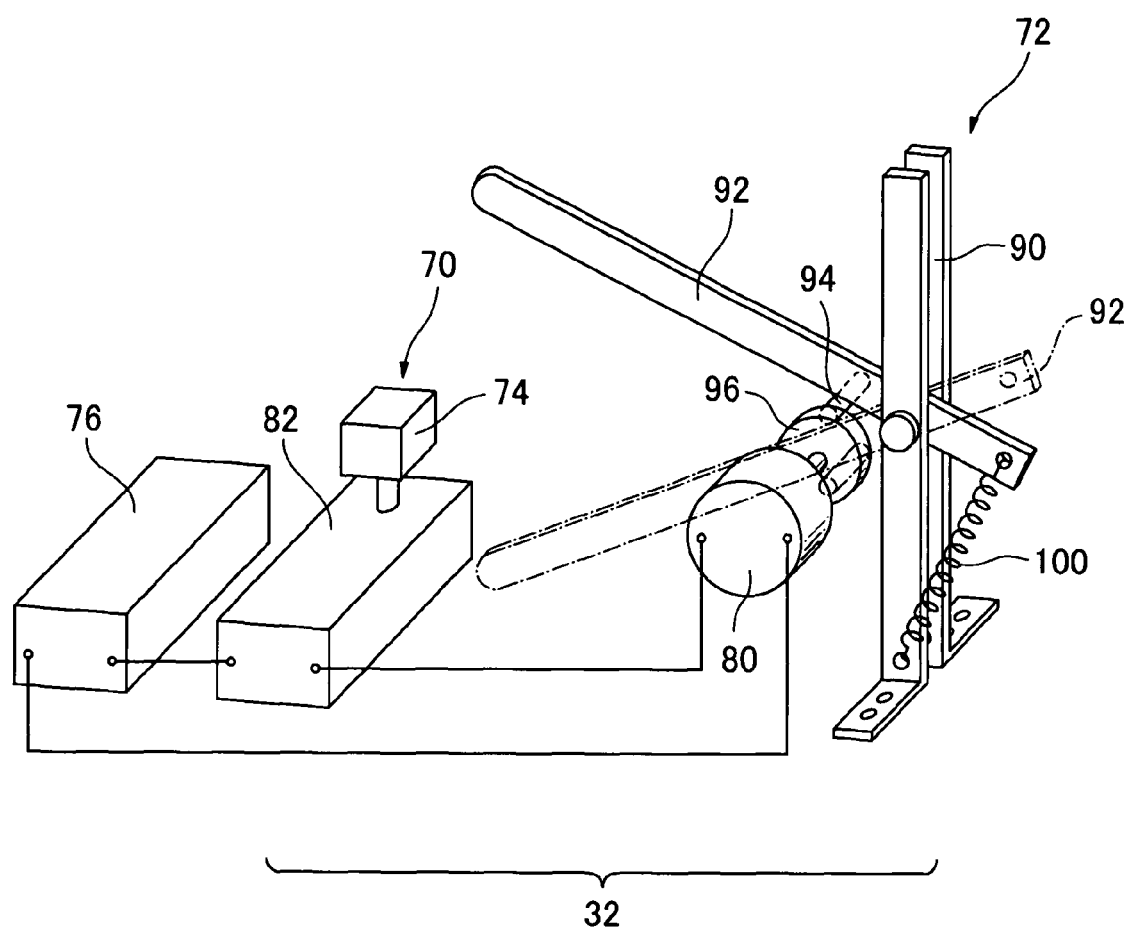
FIG. 3 is a perspective view illustrating an exemplary actuator according to the present invention.

The actuator 32, as can be seen in FIG. 3, comprises an earthquake detector 70 and a driving unit 72. The earthquake detector 70 includes a vibration sensor unit 74 that has well-known vibration sensors built therein, a power supply unit 76 capable of switching to an emergency battery used in case of power failure, and an arithmetic operating/driving unit 82 sending an earthquake detecting/driving signal to a rotary solenoid 80 in the driving unit 72 in response to the earthquake detection signal from the vibration sensor unit 74.

The driving unit 72 includes a stopper arm 92 pivotally fixed to support posts 90, and the rotary solenoid 80 actuating the stopper arm 92. The rotary solenoid 80 has a rotary 96 having its finger 94 engaged with the stopper arm 92. The rotary 96 rotates in response to the earthquake detection signal from the arithmetic operating/driving unit 82 to displace the stopper arm 92 from one position, shown with a solid line in FIG. 3, namely, a position where the stopper disc 30 is raised by the stopper arm 92, to another position, shown with a broken line in FIG. 3, namely, a position where the stopper disc 30 is not raised by the stopper arm 92.

An extension spring 100 connecting the remaining end of the stopper arm 92 with a base of one of the support posts 90 functions to reduce the influence of the gravitational force applied to the stopper arm in a counter-clockwise direction in FIG. 3.

The vibration sensors built in the vibration sensor unit 74 can utilize, among others, the following methods: a limit switch that turns on at the tilt of a pendulum, detecting a change of the angle of reflection and/or the interruption of a laser light caused by a change in a liquid surface at the beginning of an earthquake, a switch triggered by the up and down movement of a permanent magnet caused by a change in a liquid surface, which turns on a reed switch, and so forth.

When the urn-like article A with flame-shaped frills is seated on the display floor plate 12, the article A is positioned on the seat panel 20. The seat panel 20, when fitted in the aperture 14, is flush with the display floor plate 12, due to the engagement of the stopper disc 30 with the stopper arm 92.

In the event of an earthquake, the vibration sensor unit 74 detects it and generates an earthquake detection signal, which it sends to the arithmetic operating/driving unit 82. The arithmetic operating/driving unit 82 provides an earthquake detecting/driving signal to the rotary solenoid 80. The rotary solenoid 80 rotates the rotary 96 and disengages the stopper disc 30 from the stopper arm 92 so that the shaft 22 and the seat panel 20 with the article A seated thereon are dropped.

The velocity at which the shaft 22 is dropped (the "dropping velocity") is regulated, taking into consideration the seat-panel's sensitivity to the earthquake and the strength of the shock at the moment a halt is brought to the article's fall, both of which are greatly affected by the weight of the article A. The dropping velocity of the shaft 22 is moderated by the air cylinder 40. The air cylinder's abilities to reduce the dropping velocity of the article and to absorb shocks can be controlled by interrupting and resuming a fluid communication from the compressor tank 60 to the air cylinder 40 and regulating the adjusting valve 62.

The position at which the fall of the seat panel 20 is to be halted is determined so as a result of light contact of the middle section of the article A with the tire tube 18 encircling the aperture 14, so that there is no fear of the article tumbling down. In practice, however, it is often difficult to achieve the situation in which the middle section of the article A is lightly contacting the tire tube 18 around the aperture 14. For this reason, the position at which the fall of the seat panel 20 is to be halted is regulated by selecting the adjusting cap 52 to make the seat panel reach a level as desired.

What is claimed is:

1. An earthquake-proof plinth comprising
   a display floor plate having an aperture dimensioned and shaped to fit a middle section of an article seated on the plinth, the aperture having a vertical axis;
   a seat panel having a horizontal orientation and moveable vertically in the aperture along the vertical axis of the aperture, wherein the seat panel maintains the horizontal orientation as it moves vertically in the aperture, whereby an article seated on the seat panel remains seated on the seat panel as the seat panel moves vertically in the aperture;
   a shaft extending vertically downward from and supporting the seat panel, wherein the shaft is moveable vertically between a normal position in which the seat panel is flush with the display floor plate and a dropped position in which the seat panel is dropped below the display floor plate while maintaining its horizontal orientation;
   a vibration sensor for detecting vibrations;
   a shaft stopper for stopping the seat panel and shaft in a shock-absorbing elastic fashion at a predetermined position at which the middle section of an article seated on the seat panel is fitted in the aperture of the floor plate; and
   a retainer that normally retains the shaft in the normal position to keep the seat panel flush with the display floor plate and that releases the shaft in response to a vibration detection signal from the vibration sensor to let the seat panel and shaft drop.

2. The earthquake-proof plinth according to claim 1, wherein the shaft stopper includes an air cylinder coupled to the shaft for providing the shaft stopper with shock absorption capabilities.

3. The earthquake-proof plinth according to claim 1, wherein the shaft stopper includes a shock-absorbing unit providing the shaft stopper with adjustable shock absorption capabilities.

4. The earthquake-proof plinth according to claim 1, wherein the shaft stopper includes an adjustment mechanism for adjusting the pre-determined position where the shaft is to be stopped.

5. The earthquake-proof plinth according to claim 1, further comprising a shock-absorbing element provided in the display floor plate, encircling the upper perimeter of the aperture.

6. The earthquake-proof plinth according to claim 5, wherein the shock-absorbing element is an air-filled tube.

7. The earthquake-proof plinth according to claim 1, wherein the shaft stopper has a portion fixed on an intermediate portion of the shaft, and wherein the retainer releasably retains the portion of the shaft stopper fixed on the intermediate portion of the shaft.

8. The earthquake-proof plinth according to claim 1, wherein the shaft extends downwardly through the aperture.

9. The earthquake-proof plinth according to claim 1, wherein the shaft moves vertically along the longitudinal axis of the aperture.

10. An earthquake-proof plinth comprising
    a display floor plate having an aperture dimensioned and shaped to fit a middle section of an article seated on the plinth, the aperture having a vertical axis;
    a horizontal seat panel movable vertically in the aperture along the vertical axis of the aperture;
    a shaft extending vertically downward from and through the aperture, wherein the shaft supports the seat panel and is movable vertically between a normal position in which the seat panel is flush with the display floor plate and a dropped position in which the seat panel is dropped below the display floor plate;
    a vibration sensor for detecting vibrations;
    a shaft stopper for stopping the seat panel and shaft in a shock-absorbing elastic fashion at a predetermined position at which the middle section of an article seated on the seat panel is fitted in the aperture of the floor plate, the shaft stopper having a portion fixed on an intermediate portion of the shaft; and
    a retainer that normally engages the portion of the shaft stopper fixed on the intermediate portion of the shaft, for retaining the shaft in the normal position to keep the seat panel flush with the display floor plate and that releases the portion of the shaft stopper fixed on the intermediate portion of the shaft in response to a vibration detection signal from the vibration sensor to let the seat panel and shaft drop.

11. The earthquake-proof plinth according to claim 10, wherein the shaft stopper further includes a shock absorber coupled to the bottom of the shaft.

12. The earthquake-proof plinth according to claim 10, wherein the shaft stopper further includes a shock absorber for elastically engaging the portion of the shaft stopper fixed on the intermediate portion of the shaft when the shaft is in the dropped position.

13. The earthquake-proof plinth according to claim 10, wherein the shaft stopper includes an adjustment mechanism for adjusting the pre-determined position where the shaft is to be stopped.

14. The earthquake-proof plinth according to claim 10, further comprising a shock-absorbing element encircling the upper perimeter of the aperture.

15. The earthquake-proof plinth according to claim 10, wherein the shaft stopper further includes a cylinder and a piston member reciprocatable within the cylinder, the piston member being coupled to the bottom of the shaft.

16. The earthquake-proof plinth according to claim 15, wherein the portion of the shaft stopper fixed on an intermediate portion of the shaft is a stopper disc, and wherein the shaft stopper further includes an adjusting cap positioned on top of the cylinder for adjusting the predetermined position where the shaft is to be stopped.

17. The earthquake-proof plinth according to claim 16, wherein the shaft stopper further includes a coil spring positioned on top of the adjusting cap for elastically engaging the stopper disc when the shaft is in the dropped position.

18. The earthquake-proof plinth according to claim 10, wherein the shaft moves vertically along the longitudinal axis of the aperture.

* * * * *